United States Patent
Chu et al.

(10) Patent No.: US 10,526,959 B2
(45) Date of Patent: Jan. 7, 2020

(54) TURBOCHARGED ENGINE COOLANT SYSTEM

(71) Applicants: HYUNDAI MOTOR COMPANY, Seoul (KR); KIA MOTORS CORPORATION, Seoul (KR)

(72) Inventors: Dong Ho Chu, Ansan-si (KR); Jong Il Park, Seoul (KR); Hyeon Ho Kim, Yongin-si (KR); Dong Hee Han, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 481 days.

(21) Appl. No.: 15/369,048

(22) Filed: Dec. 5, 2016

(65) Prior Publication Data

US 2018/0073426 A1    Mar. 15, 2018

(30) Foreign Application Priority Data

Sep. 12, 2016 (KR) .......................... 10-2016-0117070

(51) Int. Cl.
*F02B 39/00* (2006.01)
*F02B 37/04* (2006.01)
*F01P 3/12* (2006.01)

(52) U.S. Cl.
CPC .............. *F02B 39/005* (2013.01); *F01P 3/12* (2013.01); *F02B 37/04* (2013.01);
(Continued)

(58) Field of Classification Search
CPC ....... F02C 6/12; F01P 3/12; F01P 3/20; F02B 39/005; Y02T 10/144
(Continued)

(56) References Cited

U.S. PATENT DOCUMENTS 6,860,349 B2 * 3/2005 Ogawa .................... B60L 58/26
180/65.225
8,821,136 B2 * 9/2014 Komatsu ............. F04D 25/0606
417/423.12

(Continued)

FOREIGN PATENT DOCUMENTS

JP    H05-141260 A    6/1993
JP    2001349628 A  * 12/2001
(Continued)

OTHER PUBLICATIONS

Office Action issued in corresponding Korean Patent Application No. 10-2016-0117070, dated Sep. 18, 2017.
(Continued)

*Primary Examiner* — Phutthiwat Wongwian
*Assistant Examiner* — Edward Bushard
(74) *Attorney, Agent, or Firm* — Morgan, Lewis & Bockius LLP

(57) ABSTRACT

An engine structure for a vehicle includes: a turbocharger rotating by a flow of exhaust gas and compress intake air; a first runner communicating with at least one of a plurality of combustion chambers which are formed in an engine and communicating with the turbocharger; a second runner communicating with remaining combustion chambers which are not in communication with the first runner; and a supercharger rotating by a motor, which is cooled by a coolant, and compressing intake air.

9 Claims, 2 Drawing Sheets

(52) U.S. Cl.
CPC ....... *F01P 2060/02* (2013.01); *F01P 2060/12* (2013.01); *Y02T 10/144* (2013.01)

(58) Field of Classification Search
USPC ........................................................ 60/605.3
See application file for complete search history.

(56) References Cited

U.S. PATENT DOCUMENTS

| | | | |
|---|---|---|---|
| 9,157,363 B2* | 10/2015 | Wade | F02M 26/08 |
| 9,500,199 B2* | 11/2016 | Joergl | F01K 23/065 |
| 2019/0048792 A1* | 2/2019 | Yamashita | H02K 11/25 |

FOREIGN PATENT DOCUMENTS

| | | |
|---|---|---|
| JP | 2003-097280 A | 4/2003 |
| JP | 2007-518019 A | 7/2007 |
| JP | 2010-180711 A | 8/2010 |
| JP | 2012-012989 A | 1/2012 |
| KR | 10-1998-029527 A | 7/1998 |
| KR | 20-1998-0049000 U | 10/1998 |
| KR | 10-2015-0066354 A | 6/2015 |
| KR | 10-2015-0074276 A | 7/2015 |

OTHER PUBLICATIONS

Korean Office Action issue in Application No. 10-2016-0117070 dated Feb. 12, 2018.

* cited by examiner

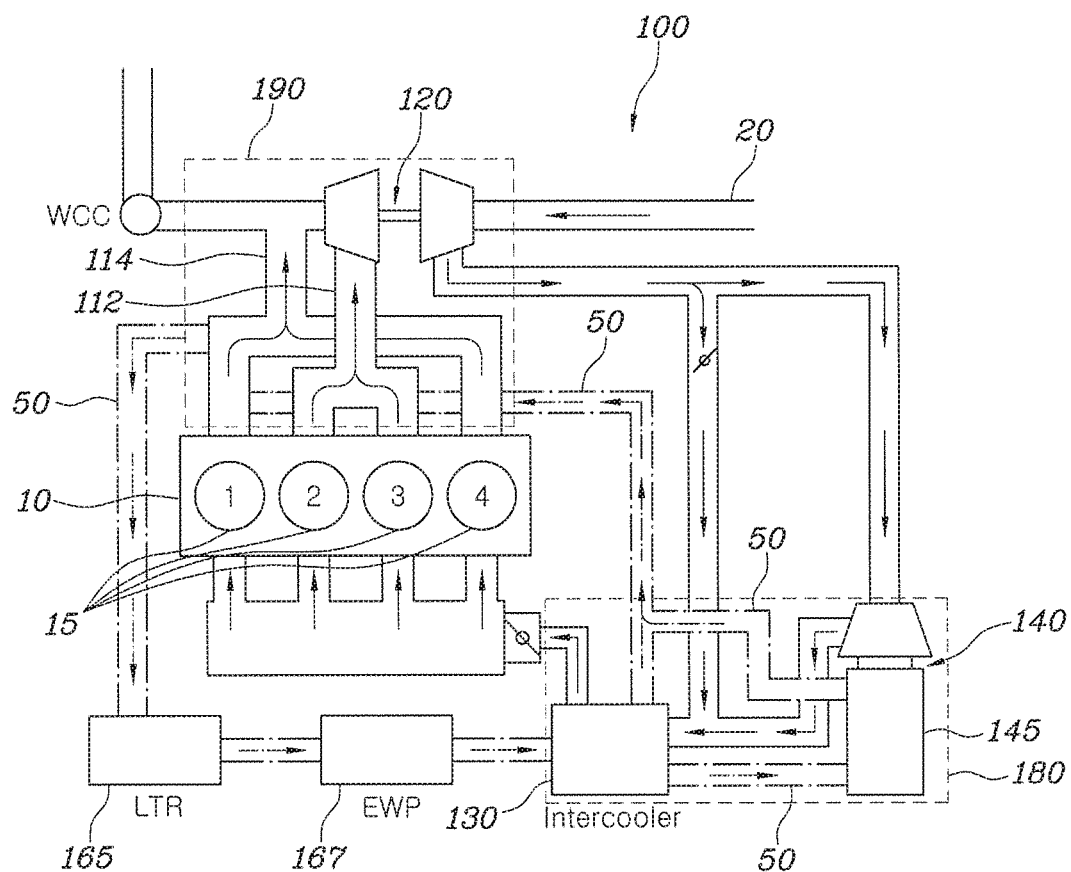
[FIG.1]

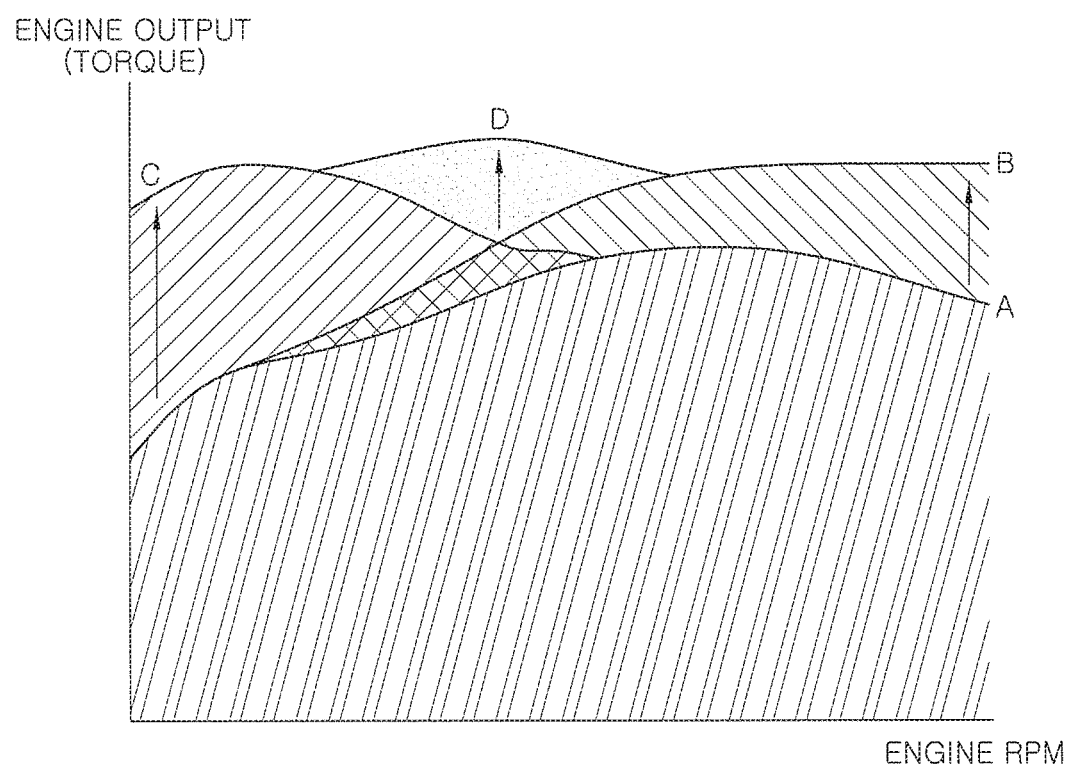
[FIG.2]

TURBOCHARGED ENGINE COOLANT SYSTEM

CROSS REFERENCE TO RELATED APPLICATION

The present application claims the benefit of priority to Korean Patent Application No. 10-2016-0117070 filed on Sep. 12, 2016, the entire content of which is incorporated herein for all purposes by this reference.

TECHNICAL FIELD

The present disclosure relates to an engine structure for a vehicle, and more particularly, to an engine structure for a vehicle in which flow passages for intake air and exhaust gas are formed and an intake and exhaust side cooling system are formed.

BACKGROUND

A vehicle engine includes a flow passage of intake air flowing toward combustion chambers of the engine, and a flow passage of exhaust gas discharged from the combustion chambers. Particularly, when a turbocharger or a supercharger is provided, it is important to appropriately design a flow passage of intake air or exhaust gas of the engine.

Furthermore, effectively designing a cooling system for appropriately adjusting the temperature of intake air or intake-side devices and appropriately adjusting the temperature of exhaust gas or exhaust-side devices is an important challenge in enhancing the performance of the engine.

The foregoing is intended merely to aid in the understanding of the background of the present disclosure, and is not intended to mean that the present disclosure falls within the purview of the related art that is already known to those skilled in the art.

SUMMARY

The present disclosure has been made keeping in mind the above problems occurring in the related art, and the present disclosure is intended to propose an engine structure for a vehicle in which a turbocharger is provided and an efficient exhaust passage is formed, and which includes a cooling system for effectively cooling an intake air passage and an exhaust passage.

According to an exemplary embodiment of the present disclosure, an engine structure for a vehicle includes: a turbocharger rotating by a flow of exhaust gas and compressing intake air; a first runner communicating with at least one of a plurality of combustion chambers formed in an engine and communicating with the turbocharger; a second runner communicating with remaining combustion chambers which are not in communication the first runner; and a supercharger rotating by a motor, which is cooled by a coolant and compress intake air.

The first runner and the second runner may communicate with different combustion chambers of the plurality of combustion chambers formed in the engine so that exhaust gas flows alternately through the first runner and the second runner.

The engine structure may further include an intercooler provided on an intake air passage of the engine and cooling, using the coolant, the intake air that has passed through the turbocharger or the supercharger. A coolant passage may be provided between the supercharger and the intercooler so that the supercharger and the intercooler may communicate with each other through the coolant passage, whereby an intake air water-cooling system sharing coolant therebetween may be formed.

Each of the turbocharger, the first runner, and the second runner may include a water jacket through which the coolant flows, and a coolant passage may be provided such that the water jackets communicate with each other, whereby an exhaust water-cooling system sharing coolant among the turbocharger, the first runner, and the second runner may be formed.

At least a portion of the turbocharger may integrally include the first runner.

The turbocharger, the first runner, and the second runner may be made of aluminum.

The engine structure may further include an intercooler provided on an intake air passage of the engine and cooling, using the coolant, the intake air that has passed through the turbocharger or the supercharger. Each of the turbocharger, the first runner, and the second runner may include a water jacket through which the coolant flows, and wherein a coolant passage may be provided among the turbocharger, the first runner, the second runner, the intercooler, and the supercharger so that an intake and exhaust water-cooling system sharing coolant thereamong may be formed.

The intake and exhaust water-cooling system may include a radiator and a water pump so that circulation of coolant separated from coolant for cooling the combustion chambers in the engine may be formed.

In the intake and exhaust water-cooling system, the radiator may discharge, to an outside, heat of the coolant that has absorbed exhaust heat while passing through the turbocharger, the first runner, and the second runner.

In the intake and exhaust water-cooling system, the coolant that has passed through the intercooler and the supercharger flows toward the turbocharger, the first runner, and the second runner.

BRIEF DESCRIPTION OF THE DRAWINGS

The above and other objects, features and other advantages of the present disclosure will be more clearly understood from the following detailed description when taken in conjunction with the accompanying drawings, in which:

FIG. 1 is a view illustrating an engine structure for vehicles according to an embodiment of the present disclosure; and FIG. 2 is a graph typically showing the effect of improvement in output torque of the engine structure according to the embodiment of the present disclosure.

DETAILED DESCRIPTION

Hereinafter, an embodiment of the present disclosure will be described with reference to the attached drawings.

As shown in FIGS. 1 and 2, an engine structure 100 for vehicles according to the embodiment of the present disclosure includes: a turbocharger 120 rotating by exhaust gas flow so as to compress intake air; a first runner 112 communicating with at least one one of a plurality of combustion chambers 15 formed in an engine 10 and communicating with the turbocharger 120 so as to form a turbo exhaust system; a second runner 114 communicating with remaining ones of the plurality of combustion chambers 15 formed in the engine 10, other than the at least one communication chamber 15 that communicates with the first runner 112, so as to form a natural exhaust system; and a supercharger 140 rotating by a motor 145 so as to compress intake air and configured such that the motor 145 is cooled by coolant.

In more detail, the turbocharger 120 rotates by the effect of exhaust flow so as to compress intake air. The turbocharger 120 includes a turbine and a compressor (not shown). The turbine is provided on an exhaust flow passage so that the turbine can be rotated by the flow of exhaust gas. The compressor is provided on an intake air flow passage 20, and shares a rotating shaft with the turbine and thus rotates along with the turbine.

The compressor, which rotates along with the rotation of the turbine, compresses intake air, thus increasing the flow rate of air to be drawn into the combustion chambers 15. Thereby, the output torque of the engine 10 that can be obtained from the same capacity of combustion chambers 15 is increased.

The first runner 112 communicates with some of the plurality of combustion chambers 15 formed in the engine 10 and communicates with the turbocharger 120 so as to form the turbo exhaust system. The second runner 114 communicates with remaining ones of the plurality of combustion chambers 15 formed in the engine 10, other than the communication chambers 15 that communicate with the first runner 112, thus forming the natural exhaust system.

In an exemplary embodiment of the present disclosure, the exhaust flow passage is formed of the first runner 112 and the second runner 114. The first runner 112 and the second runner 114 communicate with the combustion chambers 15 of the engine 10 and function as a flow path along which exhaust gas discharged form the combustion chambers 15 flows.

The first runner 112 and the second runner 114 communicate with different combustion chambers 15 so that exhaust gas generated per one combustion cycle of the engine 10 is supplied to only one of the first runner 112 or the second runner 114.

Particularly, the first runner 112 communicates with the turbocharger 120 and forms the turbo exhaust system. That is, exhaust gas flowing through the first runner 112 rotates the turbine while passing through the turbocharger 120. On the other hand, the second runner 114 forms the natural exhaust system without passing through the turbocharger 120. The second runner 114 is joined with the first runner 112 at a downstream side of the turbocharger 120, thus forming a single exhaust flow passage.

In the present disclosure, the turbo exhaust system provided with the turbocharger 120 means an exhaust gas flow passage that is affected by the turbocharger 120. The natural exhaust system is an exhaust system separated from the turbocharger 120 and means an exhaust gas flow passage that is not affected by or less affected by the turbocharger 120, compared to that of the turbo exhaust system.

The turbocharger 120 obtains rotating force from exhaust gas and varies in performance depending on conditions of the rotation of the engine 10. In detail, in the case where the engine 10 is in a low-speed region, it is difficult for the turbocharger 120 to rotate at a predetermined rpm level or more and effectively compress exhaust gas. In this case, rather, the turbocharger 120 may function as a resistor that impedes the flow of exhaust gas and increase exhaust pumping loss of the engine 10, thus operating against improvement in output of the engine 10.

When the engine 10 is in a medium-speed region or more, the rotating speed of the turbocharger 120 becomes a predetermined rpm level or more, whereby the turbocharger 120 begins to effectively compress exhaust gas. Consequently, the air intake rate is increased so that the output of the engine 10 can be enhanced. The closer to a high-speed region of the engine, the more the above-mentioned advantageous effect of the turbocharger 120 is increased.

In the case where the first runner 112 and the second runner 114 are joined with each other in the turbocharger 120 or at an upstream side of the turbocharger 120 so as to form a single exhaust flow passage, exhaust gas that flows through any one of the first and second runner 112 and 114 may act as a factor of increasing the exhaust pumping loss of the combustion chambers 15 that communicate with the other runner.

For example, the flow of exhaust gas discharged from the first runner 112 may be impeded by the turbocharger 120. In particular, at the upstream side of the turbocharger 120, a reduction in exhaust pressure of the first runner 112 is delayed.

In this state, when exhaust gas is supplied to the second runner 114, the turbocharger 120 or the second runner 114 that communicates with the first runner 112 at the upstream side of the turbocharger 120 is increased in power consumption for exhaust pumping. This means an increase in exhaust pumping loss of the combustion chambers 15 that discharge exhaust gas to the second runner 114.

Although an exhaust sequence of the first runner 112 and the second runner 114 is changed, the same phenomenon as that of the above-mentioned example pertaining in an increase in exhaust pumping loss due to exhaust interference between the runners is caused. Particularly, an output power reduction phenomenon of the engine 10 attributable to the exhaust interference is easily caused in a low or medium speed region in which the exhaust impeding effect due to the turbocharger 120 is increased because the flow energy of exhaust gas is comparatively low, compared to that of the high-speed region of the engine 10 in which the flow energy of exhaust gas is high sufficient for the exhaust gas to flow via the turbocharger 120.

An exemplary embodiment of the present disclosure provides a combination exhaust system in which the turbo exhaust system and the natural exhaust system are separately provided from each other, so as to improve the exhaust interference phenomenon due to the turbocharger 120. In the combination exhaust system of the present disclosure, even if exhaust gas is supplied to the first runner 112 and the flow of exhaust gas via the turbocharger 120 is thus formed, exhaust gas flowing through the second runner 114 meets the exhaust flow of the first runner 112 at the downstream side of the turbocharger 120 at which exhaust gas stagnation of the first runner 112 has been removed. Therefore, the exhaust pumping loss due to the exhaust interference can be markedly reduced.

Moreover, even in the first runner 112, during a process of discharging exhaust gas, an exhaust gas stagnation phenomenon due to exhaust gas discharged from the second runner 114 is markedly reduced. Thereby, the exhaust pumping loss can be markedly reduced. Furthermore, a reduction in exhaust pumping loss thanks to the combination exhaust system is advantageous for improving the output of the engine 10, particularly, in the low or medium speed region of the engine 10, in the same vein as that of the above description.

As described above, in the present disclosure, the exhaust passage is formed of the first runner 112 and the second runner 114 that communicate with different combustion chambers 15. The first runner 112 forms the turbo exhaust system, and the second runner 114 forms the natural exhaust system, whereby the combination exhaust system is embodied. Therefore, with regard to application of the turbocharger 120, the output efficiency of the engine 10 in the low or medium speed region can be improved.

In FIG. 1, there are illustrated the first runner 112 that communicates with the turbocharger 120 and forms the turbo exhaust system, and the second runner 114 that joins with the first runner 112 at the downstream side of the turbocharger 120 and forms the natural exhaust system.

FIG. 2 shows a graph typically showing improvement in output torque of the engine 10 thanks to formation of the combination exhaust system. In FIG. 2, line A shows the output torque of a general engine which does not include the turbocharger 120, the supercharger 140 or the combination exhaust system, and line B shows the output torque of the engine 10 that is enhanced in the medium- or high-speed region in the case where the engine 10 is provided with the turbocharger 120.

In particular, line D shows the output torque of the engine 10 that is enhanced in the low- or medium-speed region in the case where the turbocharger 120 is mounted to the engine 10 according to application of the combination exhaust system as proposed in the present disclosure.

The supercharger 140 rotates by the motor 145 so as to compress intake air. The motor 145 is cooled by a coolant.

In detail, the supercharger 140 uses a separate power source rather than using the flow energy of exhaust gas, unlike the turbocharger 120. The supercharger 140 according to the present disclosure particularly comprises a compressor which rotates using the motor 145.

As described above, the turbocharger 120 requires a predetermined level or more of engine revolutions per minute (RPM) so as to effectively compress intake air. In other words, with regard to the turbocharger 120, in the low-speed region of the engine 10 in which the RPM thereof is a predetermined level or less, it is difficult to expect the effect of improvement in the output of the engine 10 that can be obtained by an increase in air intake rate. However, in the case of the present disclosure, the supercharger 140 compresses intake air in the low- or medium-speed region of the engine 10, thus compensating the inefficiency region pertaining to the use of the turbocharger 120.

The compensation relationship between the turbocharger 120 and the supercharger 140 can be understood with reference to FIG. 2. Referring to line B of FIG. 2, it can be appreciated that the effect of improvement in output of the engine 10 in the low speed region in which the engine RPM is low is less than that of the high-speed region. However, referring to line C pertaining to the use of the supercharger 140 in the engine 10 provided with the turbocharger 120, it can be understood that the output torque in the low or medium speed region of the engine 10 is markedly enhanced.

That is, in the present disclosure, intake air is compressed using the supercharger 140 and the turbocharger 120. Particularly, because the supercharger 140 is used in the low-speed region of the engine 10 that corresponds to the inefficiency operation region of the turbocharger 120, improvement in the output torque of the engine 10 can be realized in the entire region of the engine RPM (in addition, improvement in the output torque in the medium-speed region of the engine 10 using the combination exhaust system has been described above).

With regard to improvement in the output torque in the low or medium speed region of the engine 10 using the supercharger 140, depending on driving conditions of the vehicle, an operation maintenance duration of the supercharger 140 may be markedly increased compared to an estimated time in design, and the RPM of the supercharger 140 may be markedly increased. In this case, it is very important to prevent burning, etc. from being caused by heat generated from the motor 145.

For this, in the present disclosure, the motor 145 of the supercharger 140 is cooled, particularly, by a water cooling method, so that the operation duration of the supercharger 140 can be markedly increased, and the burning damage of the motor 145 can be prevented. As such, in the present disclosure, because the supercharger 140 is used to compensate the inefficiency region of the turbocharger 120, there is increased need to prevent burning damage of the motor 145 of the supercharger 140. With regard to this, it is very effective to use the water cooling method in cooling the motor 145.

Particularly, in the present disclosure, a region in which the supercharger 140 is mainly operated corresponds to the low or medium speed region of the engine 10. Therefore, the cooling may not be satisfactorily achieved by an air cooling method. Furthermore, in the case of the use of coolant, a cooling rate may be markedly increased because of a difference in specific heat, compared to that of the air cooling method.

Eventually, in the present disclosure, the output performance in the medium or high speed region of the engine 10 can be enhanced by the turbocharger 120, and the output performance in the low or medium speed region of the engine 10 can be enhanced by the supercharger 140. As such, the exhaust system is formed of a combination exhaust system, whereby the output performance, particularly, in the medium speed region of the engine 10 can be markedly enhanced.

Moreover, in consideration of the operating time of the supercharger 140 that is increased to enhance the output in the low or medium speed region of the engine 10 using the supercharger 140, the motor 145 is cooled by a water cooling method. Therefore, despite an increase in the operating time of the supercharger 140, burning damage of the supercharger 140 can be effectively prevented, and the output performance in the entire speed region of the engine 10 can be enhanced.

FIG. 1 schematically shows the supercharger 140 that is configured to be cooled by the water cooling method. Referring to FIG. 1, it can be understood that the supercharger 140 is provided on the intake air flow passage 20 and configured with a coolant passage 50 so that the supercharger 140 can be cooled by the water cooling method.

Referring to FIG. 1, in the engine structure 100 for vehicles according to an embodiment of the present disclosure, the first runner 112 and the second runner 114 communicate with different ones among the plurality of combustion chambers 15 formed in the engine 10 such that exhaust gas flows alternately through the first runner 112 and the second runner 114.

In detail, the first runner 112 and the second runner 114 communicate with different combustion chambers 15 such that exhaust gas is alternately supplied in consideration of an ignition sequence of the combustion chambers 15.

Referring to FIG. 1, in an exemplary embodiment, the first runner 112 communicates with No. 2 and No. 3 combustion chambers 15 of the engine 10, and the second runner 114 communicates with No. 1 and No. 4 combustion chambers 15 of the engine 10. The ignition sequence of the combustion chambers 15 in the engine 10 may be a sequence of Nos. 1, 3, 4 and 2. Alternatively, the ignition sequence may be a sequence of Nos. 1, 2, 4 and 3.

However, the above-mentioned ignition sequence is only for illustrative purpose. Although the ignition sequence of the combustion chambers 15 of the engine 10 is different from the above-mentioned case, the first runner 112 and the second runner 114 will be ultimately provided such that combustion chambers 15 having successive ignition sequences do not communicate with any one of the first and second runners 112 and 114.

Furthermore, there is no need for the first runner 112 which communicates with the turbocharger 120 and forms the turbo exhaust system to be necessarily a runner that communicates with the No. 2 and No. 3 combustion chambers 15 of the engine 10, as shown in FIG. 1. Unlike the case of FIG. 1, of the first runner 112 and the second runner 114, the runner that communicates with the turbocharger 120 may be changed.

Ultimately, the first runner 112 and the second runner 114 are configured such that each of them does not communicate with combustion chambers 15 having successive ignition sequences so that exhaust gas is alternately supplied from the combustion chambers 15.

As such, since the flow of exhaust gas supplied from the combustion chambers 15 is alternately performed by the first runner 112 and the second runner 114 and the combination exhaust system according to the present disclosure is used, exhaust interference between the runners can be minimized, and the output torque of each combustion chamber 15 can be prevented from being irregular.

Therefore, the embodiment of the present disclosure has advantageous effects of restraining deterioration in output torque of the engine 10 due to exhaust interference, and enhancing the stability of the output torque of the engine 10.

As shown in FIG. 1, the engine structure 100 for vehicles according to the embodiment of the present disclosure further includes an intercooler 130 which is provided on the intake air passage 20 of the engine 10 and configured to cool intake air that has passed through the turbocharger 120 or the supercharger 140. A coolant passage 50 is provided between the supercharger 140 and the intercooler 130 so that the supercharger 140 and the intercooler 130 communicate with each other through the coolant passage 50. Thereby, an intake air water-cooling system 180 in which the supercharger 140 and the intercooler 130 share coolant is formed.

In detail, in the embodiment of the present disclosure, the intercooler 130 is provided to cool intake air that has passed through the turbocharger 120 or the supercharger 140. Since the temperature of compressed intake air is reduced by the intercooler 130, an engine hesitation phenomenon of the engine 10 can be prevented, and the intake rate of air which can be drawn into the combustion chambers 15 can be increased.

The intercooler 130 according to the embodiment of the present disclosure comprises a water cooling intercooler 130 which cools intake air using coolant. The intercooler 130 and the supercharger 140 are configured to communicate with each other through the coolant passage 50 so that the intercooler 130 and the supercharger 140 can share coolant. In the present disclosure, the water cooling system provided for the intercooler 130 and the supercharger 140 is called an intake air water-cooling system 180.

Therefore, in forming the water cooling intercooler 130 and the water cooling supercharger 140, there is no need for two independent water cooling systems, and the intercooler 130 and the supercharger 140 can be effectively cooled by a single water cooling system.

Referring to FIG. 1, there is illustrated the intake air water-cooling system 180 in which the supercharger 140 is disposed around the intercooler 130, and the coolant passage 50 is formed in the supercharger 140 and the intercooler 130.

As shown in FIG. 1, in the engine structure 100 for vehicles according to the embodiment of the present disclosure, each of the turbocharger 120, the first runner 112 and the second runner 114 includes a water jacket through which coolant flows, and the coolant passage 50 is provided such that the water jackets communicate with each other. In this way, an exhaust water-cooling system 190 in which the water jackets share coolant is formed.

In detail, in the embodiment of the present disclosure, the water jackets are respectively provided on the turbocharger 120, the first runner 112 and the second runner 114. The water jacket of the turbocharger 120 may be provided in a housing of the turbocharger 120, particularly, in a turbine-side housing of the turbocharger 120. The water jacket of each of the first and second runners 112 and 114 may be provided in an outer wall that forms the corresponding runner.

The water jacket is space through which coolant flows. The water jackets formed in the turbocharger 120, the first runner 112 and the second runner 114 are provided to communicate with each other by the coolant passage 50. That is, the water jackets share coolant and form the exhaust water-cooling system 190.

High-temperature exhaust gas flows through the turbocharger 120 (particularly, the turbine), the first runner 112 and the second runner 114. In the case where the water jackets are provided on the first runner 112 and the second runner 114, required thermal durability of material for forming the first and second runners 112 and 114 is reduced. Therefore, the selection range of materials for forming the first and second runners 112 and 114 is increased.

The turbocharger 120, the first runner 112 and the second runner 114 forms a single cooling system in which the water jackets thereof communicate with each other. This is called the exhaust water-cooling system 190, in the present disclosure. Since the exhaust water-cooling system 190 is provided, there is not need to provide separate cooling systems for the respective components, and it is possible to cool the entirety of the exhaust side using the single cooling system.

In FIG. 1, there is illustrated the turbocharger 120, the first runner 112 and the second runner 114 which construct the exhaust water-cooling system 190 that is a single cooling system provided by forming the coolant passage 50 that couples the components with each other.

As shown in FIG. 1, in the engine structure 100 for vehicles according to an embodiment of the present disclosure, at least a portion of the housing forming the turbocharger 120 is integrally formed with the first runner 112.

In detail, as at least portion of the housing of the turbocharger 120, particularly, a portion of the housing forming the turbine side part is integrally formed with the first runner 112. Because the housing of the turbocharger 120 and the first runner 112 are integrally formed with each other, separate assembly process or sealing process after the forming process can be omitted, and the water jacket can be shared. Hence, there are advantages in embodying the exhaust water-cooling system 190.

In the engine structure 100 for vehicles according to the embodiment of the present disclosure, the turbocharger 120, the first runner 112 and the second runner 114 are formed of aluminum.

As described above, because the turbocharger 120, the first runner 112 and the second runner 114 include the water jackets to form the exhaust water-cooling system 190, the required thermal durability of the material for forming the turbocharger 120, the first runner 112, and the second runner 114 is markedly reduced.

If the exhaust water-cooling system 190 is not embodied, each of the components (the turbocharger 120, the first runner 112 and the second runner 114) forming the exhaust system must be formed of material, for example, a stainless (SUS) material, that is not thermally deformed even by high-temperature exhaust gas.

However, when the exhaust water-cooling system 190 is embodied as shown in the present disclosure, the required thermal durability of each of the components forming the exhaust system is reduced, so that the selection range of material is increased. In the case of the present disclosure, the exhaust system is formed using an aluminum (AL) material.

The AL material has thermal durability lower than that of the SUS material, but the thermal conductivity of the AL material is higher than that of the SUS material. Therefore, the cooling efficiency by the exhaust water-cooling system 190 of the present disclosure can be markedly enhanced. Furthermore, the AL material has comparatively low metal density, thus making it possible to reduce the weight of the components of the exhaust system.

In addition, the unit cost of the AL material is comparatively low, so that the manufacturing cost of the exhaust system can be markedly reduced. Particularly, because the formability of the SUS material is low, there are disadvantages in integrally forming the housing of the turbocharger 120 and the first runner 112, as described above. However, because the AL material has superior formability, there are various advantages in integrally forming the housing of the turbocharger 120 and the first runner 112.

As such, in the embodiment of the present disclosure, the exhaust water-cooling system 190 is formed for the turbocharger 120, the first runner 112 and the second runner 114 that form the exhaust system, whereby an effective cooling structure can be embodied. Furthermore, because the turbocharger 120, the first runner 112 and the second runner 114 are made of AL material, the cooling efficiency can be enhanced, the weight of the vehicle can be reduced, and the formability of the material can be enhanced.

As shown in FIG. 1, the engine structure 100 for vehicles according to the embodiment of the present disclosure further includes an intercooler 130 which is provided on the intake air passage 20 of the engine 10 and configured to cool intake air that has passed through the turbocharger 120 or the supercharger 140. Water jackets, through which coolant flows, are respectively formed on the turbocharger 120, the first runner 112 and the second runner 114. A coolant passage 50 is provided among the turbocharger 120, the first runner 112, the second runner 114, the intercooler 130 and the supercharger 140 such that they communicate with each other through the coolant passage 50. Thereby, an intake and exhaust water-cooling system 200, in which coolant is shared among the turbocharger 120, the first runner 112, the second runner 114, the intercooler 130 and the supercharger 140, is formed.

In detail, in an embodiment of the present disclosure, the intake and exhaust water-cooling system 200 may be formed by integrating the intake water-cooling system 180 and the exhaust water-cooling system 190 with each other. In this case, the coolant passage 50 is provided such that the turbocharger 120, the first runner 112 and the second runner 114 that form the exhaust system communicate with the intercooler 130 and the supercharger 140 that form the intake air system through the coolant passage 50. Thus, the exhaust system and the intake air system share coolant, thus forming a single coolant circulation system.

Referring to FIG. 1, there is illustrated the intake and exhaust water-cooling system 200 embodied by communicating the turbocharger 120, the first runner 112, the second runner 114, the intercooler 130 and the supercharger 140 with each other through the coolant passage 50. Therefore, the intake air system and the exhaust system of the engine 10 can be efficiently cooled by the single cooling system without requiring separate cooling systems being respectively provided for the intake air system and the exhaust system.

As shown in FIG. 1, in the engine structure 100 for vehicles according to the embodiment of the present disclosure, a radiator 165 and a water pump 167 are provided in the intake and exhaust water-cooling system 200 so that a separate coolant circulation structure is formed as distinct from circulation of coolant in the engine 10 for cooling the combustion chambers 15.

In detail, in the intake and exhaust water-cooling system 200 according to the embodiment of the present disclosure, the radiator 165 and the water pump 167 are separately provided to form independent water cooling systems. That is, separated from the circulation of coolant in the engine 10 for cooling the combustion chambers 15 of the engine 10, a cooling system independent from other cooling systems is embodied.

Particularly, the intake and exhaust water-cooling system 200 according to the present disclosure performs circulation of coolant, separated from the circulation of coolant in the engine 10. Thus, the intake and exhaust systems are cooled using separate coolant from coolant that is used to cool the combustion chambers 15 having very high temperatures. Therefore, the cooling performance can be markedly enhanced.

The radiator 165 may be provided at various positions, in various shapes and in various operation manners, for example, be disposed in the front of the vehicle such that heat exchange is performed in an air cooling manner. The position of the water pump 167 may be set in various manners.

In FIG. 1, there are illustrated the radiator 165, the water pump 167, and the intake and exhaust water-cooling system 200 that is embodied by the coolant passage 50 forming a single closed loop.

As shown in FIG. 1, in the engine structure 100 for vehicles according to the embodiment of the present disclosure, the radiator 165 for the intake and exhaust water-cooling system 200 is configured such that heat of coolant that absorbs exhaust heat while passing through the first runner 112 and the second runner 114 is discharged to the outside.

In detail, in the embodiment of the present disclosure, parts in which the heat exchange rate is highest are the turbocharger 120, the first runner 112 and the second runner 114 that form the exhaust system. In the exhaust system, high-temperature exhaust gas flows. Hence, the temperature increase rate of coolant that absorbs heat from the exhaust system is highest in the intake and exhaust water-cooling system 200.

Therefore, the radiator 165 is disposed, based on the flow of coolant, at the downstream side of the exhaust system that is formed of the turbocharger 120, the first runner 112 and the second runner 114 so that heat of coolant that has performed heat exchange while passing through the exhaust system can be discharged to the outside. Due to the above-mentioned positional relationship, the cooling efficiency of the intake and exhaust water cooling system according to the embodiment of the present disclosure can be enhanced in each component.

In FIG. 1, there is illustrated the radiator 165 that is disposed at the downstream side of the exhaust system based on the flow of coolant.

Referring to FIG. 1, in the engine structure 100 for vehicles according to the embodiment of the present disclosure, the water pump 167 for the intake and exhaust water-cooling system 200 is configured such that coolant that has passed through the intercooler 130 and the supercharger 140 flows toward the turbocharger 120, the first runner 112 and the second runner 114.

In detail, the water pump 167 is configured such that coolant that has passed through the intake air system including the intercooler 130 and the supercharger 140 flows toward the exhaust system including the turbocharger 120, the first runner 112 and the second runner 114. That is, the water pump 167 is configured such that coolant that has passed through the exhaust system is prevented from flowing toward the intake air system.

Comparing the intake air system and the exhaust system with each other, the temperature of exhaust gas that has passed through the combustion process is higher than intake air. Therefore, if coolant that has passed through the exhaust system is used to cool the intake air system, the efficiency of cooling the intake air system may be reduced. On the contrary to this, if coolant that has passed through the intake air system is used to cool the exhaust system, the cooling performance is not greatly reduced because the temperature of the exhaust system is very high.

As such, in the embodiment of the present disclosure, the water pump 167 is configured such that coolant flows from the intake air system to the exhaust system. In a certain embodiment, coolant that has passed through the exhaust system flows toward the intake air system after discharging heat through the radiator 165. Therefore, in managing the single intake and exhaust water-cooling system 200 for cooling the intake air system and the exhaust system of the engine 10, the cooling performance can be markedly enhanced. In FIG. 1, there is illustrated the flow direction of such coolant.

According to an engine structure for vehicles described above, a turbocharger is provided and an efficient exhaust passage is formed, and a cooling system for effectively cooling an intake air passage and an exhaust passage can be embodied.

In particular, the exhaust passage of the engine is formed of a first runner and a second runner. The first runner is coupled with the turbocharger, and thus forms a turbo exhaust system. The second runner forms a natural exhaust system. Thereby, exhaust inference due to the use of the turbocharger can be minimized, whereby the output performance of the engine can be enhanced.

Furthermore, a supercharger is provided on an intake air passage. The supercharger is cooled by a water cooling method, so that an allowable operating region of the supercharger is increased, thereby effectively enhancing the output performance of the engine in a low- and medium-speed region in which the turbocharger cannot be effectively operated.

Moreover, a cooling system for cooling the exhaust passage, the turbocharger and the supercharger has a unified structure, whereby intake and exhaust side cooling efficiency of the engine can be enhanced. Consequently, the present disclosure can embody the engine structure provided with the cooling system having enhanced cooling efficiency.

Although the embodiment of the present disclosure has been described for illustrative purposes, those skilled in the art will appreciate that various modifications, additions and substitutions are possible, without departing from the scope and spirit of the invention as disclosed in the accompanying claims.

What is claimed is:

1. An engine structure for a vehicle, comprising:
a turbocharger rotating by a flow of exhaust gas and compressing intake air;
a first runner communicating with at least one of a plurality of combustion chambers of an engine, the first runner communicating with the turbocharger;
a second runner communicating with remaining combustion chambers which are not in communication with the first runner;
a supercharger rotating by a motor, which is cooled by coolant, and compressing the intake air; and
an intercooler disposed on an intake air passage of the engine and cooling, using coolant, the intake air that has passed through the turbocharger or the supercharger,
wherein a coolant passage is disposed between the supercharger and the intercooler and directly connects the supercharger and the intercooler so that the supercharger and the intercooler communicate with each other through the coolant passage, whereby an intake air water-cooling system sharing coolant therebetween is formed.

2. The engine structure according to claim 1, wherein each of the first runner and the second runner communicate with different combustion chambers of the plurality of combustion chambers so that the exhaust gas flows alternately through the first runner and the second runner.

3. The engine structure according to claim 1, wherein each of the turbocharger, the first runner, and the second runner includes a water jacket through which coolant flows, and
wherein the water jackets communicate with each other through a coolant passage, whereby an exhaust water-cooling system sharing coolant among the turbocharger, the first runner and the second runner is formed.

4. The engine structure according to claim 3, wherein at least one portion of the turbocharger is integrally formed with the first runner.

5. The engine structure according to claim 4, wherein the turbocharger, the first runner, and the second runner are made of aluminum.

6. The engine structure according to claim 1, further comprising:
an intercooler disposed on an intake air passage of the engine and cooling, using coolant, the intake air that has passed through the turbocharger or the supercharger,
wherein each of the turbocharger, the first runner, and the second runner includes a water jacket through which coolant flows, and
wherein a coolant passage is provided among the turbocharger, the first runner, the second runner, the intercooler, and the supercharger to define an intake and exhaust water-cooling system sharing coolant thereamong.

7. The engine structure according to claim 6, wherein the intake and exhaust water-cooling system includes a radiator and a water pump to define a circulation of coolant split from coolant for cooling the combustion chambers in the engine.

8. The engine structure according to claim 7, wherein in the intake and exhaust water-cooling system, the radiator discharges, to an outside heat of coolant that has absorbed exhaust heat while passing through the turbocharger, the first runner, and the second runner.

9. The engine structure according to claim 7, wherein in the intake and exhaust water-cooling system, coolant that has passed through the intercooler and the supercharger flows toward the turbocharger, the first runner, and the second runner.

* * * * *